United States Patent
Ko et al.

(10) Patent No.: US 11,552,311 B2
(45) Date of Patent: Jan. 10, 2023

(54) FUEL CELL

(71) Applicants: Hyundai Motor Company, Seoul (KR); Kia Corporation, Seoul (KR); Hanon Systems, Daejeon (KR)

(72) Inventors: Hyun Woong Ko, Seoul (KR); Yong Ha Chae, Deajeon (KR); Kil Sang Jang, Daejeon (KR)

(73) Assignees: Hanon Systems, Daejeon (KR); Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/401,050

(22) Filed: Aug. 12, 2021

(65) Prior Publication Data

US 2022/0149397 A1   May 12, 2022

(30) Foreign Application Priority Data

Nov. 10, 2020   (KR) .................. 10-2020-0149519

(51) Int. Cl.
 *H01M 8/04*      (2016.01)
 *H01M 8/04007*   (2016.01)
 *H01M 8/2465*    (2016.01)

(52) U.S. Cl.
 CPC ..... *H01M 8/04037* (2013.01); *H01M 8/2465* (2013.01)

(58) Field of Classification Search
 CPC .................. H01M 8/04037; H01M 8/2465
 See application file for complete search history.

(56) References Cited

U.S. PATENT DOCUMENTS

2017/0331126 A1*  11/2017  Gu .................. H01M 8/04037
2018/0183086 A1*  6/2018   Shin ..................... C25B 9/65

FOREIGN PATENT DOCUMENTS

| JP | 2010262894 A | 11/2010 |
| JP | 5240053 B2   | 7/2013  |
| KR | 20180088095 A | 8/2018 |
| KR | 101983702 B1 | 9/2019  |

* cited by examiner

*Primary Examiner* — Olatunji A Godo
(74) *Attorney, Agent, or Firm* — Slater Matsil, LLP

(57) ABSTRACT

An embodiment fuel cell includes a cell stack including a plurality of unit cells stacked in a first direction, a plate disposed at one of two end portions of the cell stack, the plate including a first terminal unit protruding in a second direction intersecting the first direction, a heating element including a second terminal unit engaged with the first terminal unit of the plate in the second direction, the heating element being disposed between the one of the two end portions of the cell stack and the plate, and an insulation part disposed at at least one of the first terminal unit or the second terminal unit, wherein one of the first terminal unit and the second terminal unit includes a pair of male heater terminals protruding in the second direction, and the other includes a pair of female heater terminals.

18 Claims, 14 Drawing Sheets

FUEL CELL

CROSS-REFERENCE TO RELATED APPLICATIONS

This application claims the benefit of Korean Patent Application No. 10-2020-0149519, filed on Nov. 10, 2020, which application is hereby incorporated herein by reference.

TECHNICAL FIELD

Embodiments relate to a fuel cell.

BACKGROUND

In general, a fuel cell includes a cell stack and a heater assembly. In winter, water freezes inside an end cell of the cell stack when the outdoor air temperature is low, and thus electricity is not generated in the end cell, thereby deteriorating the initial startability and power generation efficiency of the fuel cell. In order to solve this problem, the heater assembly serves to heat the end cell during initial startup. However, when the heater assembly is incorrectly assembled with other components of the fuel cell, various problems may occur, for example, inability to heat the end cell.

SUMMARY

Accordingly, embodiments are directed to a fuel cell that substantially obviates one or more problems due to limitations and disadvantages of the related art.

Embodiments provide a fuel cell having improved performance.

However, features of the embodiments are not limited to the above-mentioned features, and other features not mentioned herein will be clearly understood by those skilled in the art from the following description.

A fuel cell according to an embodiment may include a cell stack configured such that a plurality of unit cells is stacked in a first direction, a plate disposed at at least one of two end portions of the cell stack and including a first terminal unit protruding in a second direction intersecting the first direction, a heating element including a second terminal unit engaged with the first terminal unit of the plate in the second direction, the heating element being disposed between at least one of the two end portions of the cell stack and the plate, and an insulation part disposed at at least one of the first terminal unit or the second terminal unit. One of the first terminal unit and the second terminal unit may include a pair of male heater terminals protruding in the second direction, and the remaining one of the first terminal unit and the second terminal unit may include a pair of female heater terminals into which the pair of male heater terminals is inserted. Each of the pair of male heater terminals may include a first portion that is in contact with a respective one of the pair of female heater terminals, rather than being inserted into the respective one of the pair of female heater terminals. Each of the pair of female heater terminals may include a second portion that is in contact with the first portion. The insulation part may be disposed on at least one of the first portion or the second portion.

For example, each of the pair of female heater terminals may include a body forming a space into which a respective one of the pair of male heater terminals is inserted. Each of the pair of male heater terminals may include an upper surface and a lower surface formed opposite the upper surface. When each of the pair of male heater terminals is inserted into a respective one of the pair of female heater terminals, the upper surface may come into contact with the inner upper surface of the body forming the space, and the lower surface may come into contact with the inner lower surface of the body forming the space.

For example, the insulation part may be disposed on the outer lower surface formed opposite the inner lower surface of the body. The outer lower surface of the body may correspond to the second portion, and the planar area of the outer lower surface of the body may be greater than the planar area of the upper surface of each of the pair of male heater terminals.

For example, the upper surface of each of the pair of male heater terminals may correspond to the first portion, and the insulation part may be disposed on the upper surface.

For example, the insulation part may include an insulation tube formed in the shape of a tube surrounding the outer surface of the body forming the space.

A fuel cell according to another embodiment may include a cell stack configured such that a plurality of unit cells is stacked in a first direction, a plate disposed at at least one of two end portions of the cell stack and including a first terminal unit protruding in a second direction intersecting the first direction, and a heating element including a second terminal unit engaged with the first terminal unit of the plate in the second direction, the heating element being disposed between at least one of the two end portions of the cell stack and the plate. One of the first terminal unit and the second terminal unit may include a pair of male heater terminals protruding in the second direction, and the remaining one of the first terminal unit and the second terminal unit may include a pair of female heater terminals into which the pair of male heater terminals is inserted. The plate may include a terminal-mounting hole exposing the first terminal unit and an engagement guide member configured to at least partially overlap the terminal-mounting hole in the first direction and to protrude toward the terminal-mounting hole in the second direction.

For example, each of the pair of female heater terminals may include a body forming a space into which a respective one of the pair of male heater terminals is inserted. Each of the pair of male heater terminals may include an upper surface that is in contact with the inner upper surface of the body forming the space and a lower surface that is in contact with the inner lower surface of the body forming the space and is formed opposite the upper surface. At least a portion of the engagement guide member may overlap the upper surface of each of the pair of male heater terminals in the first direction.

For example, the fuel cell may further include a pad disposed between the plate and the heating element.

For example, the plate may include a concave portion in which at least one of the heating element or the pad is received, and the concave portion may face the cell stack.

For example, the fuel cell may further include a current-collecting plate disposed between the heating element and the at least one of the two end portions of the cell stack.

For example, the current-collecting plate may be received in the concave portion.

For example, the current-collecting plate may have a cross-sectional shape that is stacked over the concave portion.

For example, the engagement guide member may be disposed between the current-collecting plate and the first terminal unit.

For example, the fuel cell may further include an insulation part disposed at at least one of the first terminal unit or the second terminal unit. Each of the pair of male heater terminals may include a first portion that is in contact with a respective one of the pair of female heater terminals, rather than being inserted into the respective one of the pair of female heater terminals, and each of the pair of female heater terminals may include a second portion that is in contact with the first portion. The insulation part may be disposed on at least one of the first portion or the second portion.

For example, the plate may further include a heater wiring connector, which receives current from the outside of the plate, and a wire, which connects the first terminal unit to the heater wiring connector.

For example, the plate may correspond to at least one of a first end plate and a second end plate, which are respectively disposed at the two end portions of the cell stack.

For example, the fuel cell may further include a first end plate and a second end plate, which are respectively disposed at the two end portions of the cell stack. The plate may include a heater plate disposed between at least one of the first end plate or the second end plate and at least one of the two end portions of the cell stack.

A fuel cell according to still another embodiment may include a cell stack configured such that a plurality of unit cells is stacked in a first direction, end plates respectively disposed at two end portions of the cell stack, and heater assemblies respectively disposed between the end plates and the two end portions of the cell stack. Each of the heater assemblies may include a heater plate disposed between each of the end plates and a corresponding one of the two end portions of the cell stack and including a first terminal unit protruding in a second direction intersecting the first direction, a heating element including a second terminal unit engaged with the first terminal unit in the second direction, the heating element being disposed between the heater plate and the corresponding one of the two end portions of the cell stack, and an insulation part disposed at at least one of the first terminal unit or the second terminal unit. One of the first terminal unit and the second terminal unit may include a pair of male heater terminals protruding in the second direction, and the remaining one of the first terminal unit and the second terminal unit may include a pair of female heater terminals into which the pair of male heater terminals is inserted. Each of the pair of male heater terminals may include a first portion that is in contact with a respective one of the pair of female heater terminals, rather than being inserted into the respective one of the pair of female heater terminals, and each of the pair of female heater terminals may include a second portion that is in contact with the first portion. The insulation part may be disposed on at least one of the first portion or the second portion.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell wo according to embodiments will be described with reference to the accompanying drawings.

The fuel cell 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. Hereinafter, for convenience of description, the +x-axis direction or the −x-axis direction will be referred to as a "first direction", the +y-axis direction or the −y-axis direction will be referred to as a "second direction", and the +z-axis direction or the −z-axis direction will be referred to as a "third direction".

Figure 1:
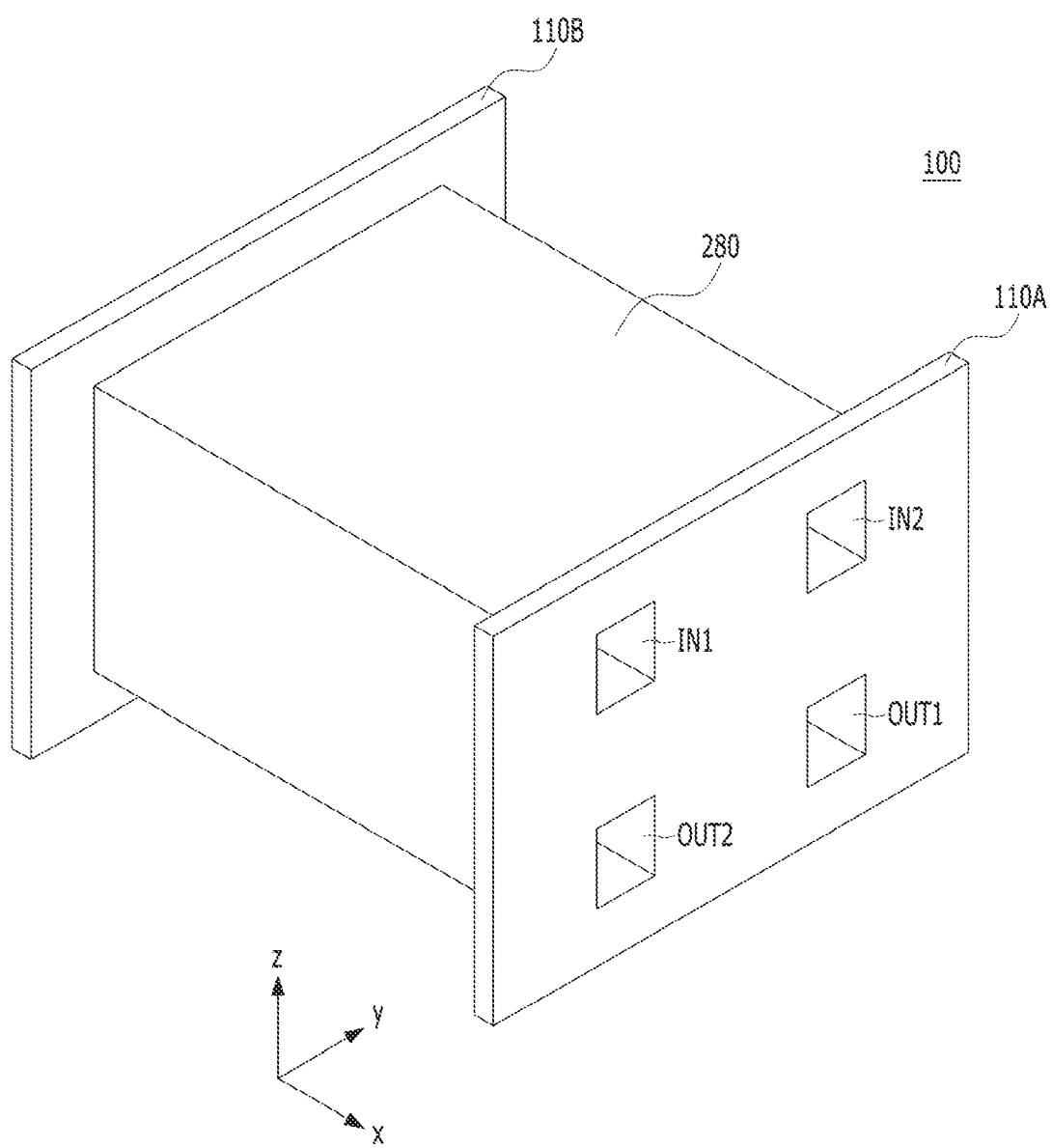
FIG. 1 is a perspective view showing the external appearance of a fuel cell according to an embodiment.
Figure 2:
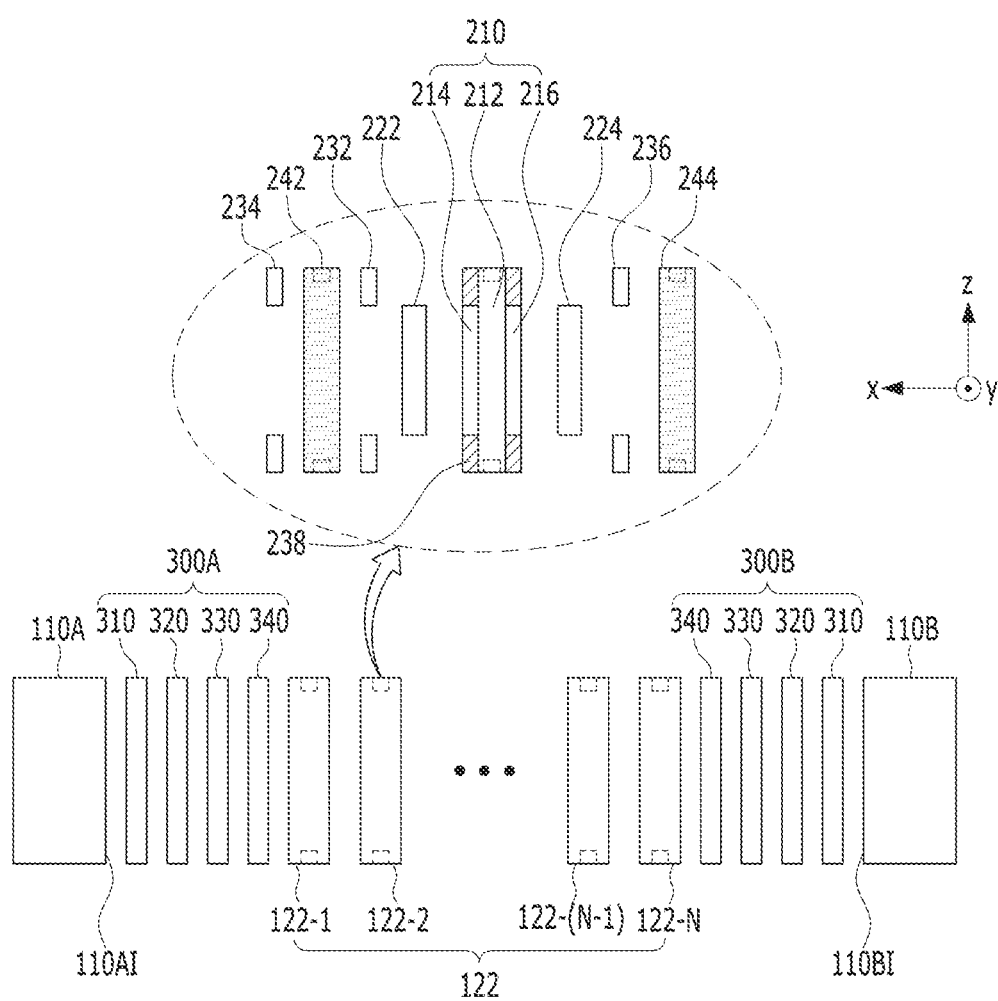
FIG. 2 is a cross-sectional view showing one example of a cell stack included in a fuel cell according to an embodiment.

FIG. 1 is a perspective view showing the external appearance of a fuel cell 100 according to an embodiment, and FIG. 2 is a cross-sectional view showing one example of a cell stack (or a power generation module) 122 included in the fuel cell wo according to the embodiment. An enclosure 280 shown in FIG. 1 is not illustrated in FIG. 2.

The fuel cell 100 may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cell.

The fuel cell 100 may include end plates (or pressing plates or compression plates) 110A and 110B, a cell stack 122, an enclosure 280, and first and second heater assemblies 300A and 300B.

The enclosure 280 shown in FIG. 1 may be engaged with the end plates 110A and 110B, and may be disposed so as to surround at least a portion of the side portions of the cell stack 122 that is disposed between the end plates 110A and 110B. The enclosure 280 may serve to clamp a plurality of unit cells together with the end plates 110A and 110B in the first direction. In other words, the clamping pressure of the cell stack 122 may be maintained by the end plates 110A and 110B, which have rigid structures, and the enclosure. However, the clamping pressure of the cell stack 122 may be maintained without using the enclosure 280. The embodiment is not limited to any specific configuration for maintaining the clamping pressure.

The end plates 110A and 110B may be disposed at the respective end portions of the cell stack 122, and may support and fix the unit cells. That is, the first end plate 110A may be disposed at one of the two end portions of the cell stack 122, and the second end plate 110B may be disposed at the other one of the two end portions of the cell stack 122.

The fuel cell 100 may include a plurality of manifolds M. The manifolds may include a first inflow communication portion (or a first inlet manifold) IN1, a second inflow communication portion (or a second inlet manifold) IN2, a third inflow communication portion (or a third inlet manifold) IN3, a first outflow communication portion (or a first outlet manifold) OUT1, a second outflow communication portion (or a second outlet manifold) OUT2, and a third outflow communication portion (or a third outlet manifold) OUT3.

One of the first and second inflow communication portions IN1 and IN2 may correspond to a hydrogen inlet through which hydrogen, which is a reactant gas, is introduced into the cell stack 122 from the outside, and the other one of the first and second inflow communication portions IN1 and IN2 may correspond to an oxygen inlet through which oxygen, which is a reactant gas, is introduced into the cell stack 122 from the outside. In addition, one of the first and second outflow communication portions OUT1 and OUT2 may correspond to a hydrogen outlet through which hydrogen, which is a reactant gas, and condensate water are discharged out of the cell stack 122, and the other one of the first and second outflow communication portions OUT1 and OUT2 may correspond to an oxygen outlet through which oxygen, which is a reactant gas, and condensate water are discharged out of the cell stack 122.

For example, the first inflow communication portion IN1 may correspond to a hydrogen inlet, the second inflow communication portion IN2 may correspond to an oxygen inlet, the first outflow communication portion OUT1 may correspond to a hydrogen outlet, and the second outflow communication portion OUT2 may correspond to an oxygen outlet.

In addition, the third inflow communication portion IN3 may correspond to a coolant inlet through which a cooling medium (e.g. coolant) is introduced from the outside, and the third outflow communication portion OUT3 may correspond to a coolant outlet through which a cooling medium is discharged to the outside.

The first and second outflow communication portions OUT1 and OUT2 may be disposed below the first and second inflow communication portions IN1 and IN2, the first inflow communication portion IN1 and the first outflow communication portion OUT1 may be disposed at positions separated from each other in a diagonal direction, and the second inflow communication portion IN2 and the second outflow communication portion OUT2 may be disposed at positions separated from each other in a diagonal direction. In the case in which the first and second inflow communication portions IN1 and IN2 and the first and second outflow communication portions OUT1 and OUT2 are disposed as described above, condensate water may be discharged from the lower portions of the unit cells included in the cell stack 122, or may remain in the lower portions of the unit cells due to gravity.

According to one embodiment, the first and second inflow communication portions IN1 and IN2 and the first and second outflow communication portions OUT1 and OUT2 may be included in any one of the first and second end plates 110A and 110B (e.g. the first end plate 110A, as shown in FIG. 1), and the third inflow communication portion IN3 and the third outflow communication portion OUT3 may be included in the other one of the first and second end plates 110A and 110B (e.g. the second end plate 110B shown in FIG. 1).

According to another embodiment, all of the first to third inflow communication portions IN1 to IN3 and the first to third outflow communication portions OUT1 to OUT3 may be included in any one of the first and second end plates 110A and 110B.

Referring to FIG. 2, the cell stack 122 may include a plurality of unit cells 122-1 to 122-N, which are stacked in the first direction. Here, "N" is a positive integer of 1 or greater, and may range from several tens to several hundreds. "N" may be determined depending on the intensity of power to be supplied from the fuel cell 100 to a load. Here, "load" may refer to a part requiring power in a vehicle that uses a fuel cell.

Each unit cell 122-$n$ may include a membrane electrode assembly (MEA) 210, gas diffusion layers (GDLs) 222 and 224, gaskets 232, 234 and 236, and separators (or bipolar plates) 242 and 244. Here, $1 \leq n \leq N$.

The membrane electrode assembly 210 has a structure in which catalyst electrode layers, in which an electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244 and the gas diffusion layers 222 and 224, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensate water" or "product water"). The condensate water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive.

The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiment is not limited to any specific configuration of the first and second gas diffusion layers 222 and 224.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 122, which generates electric power, may be secured, and thus surface pressure may be distributed uniformly over the reaction surfaces of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to current-collecting plates 340.

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e. a passage or a flow path) is formed so that hydrogen may flow therethrough.

The second separator 244 serves to supply air as a reactant gas to the air electrode 216 through the second gas diffusion layer 224. To this end, the second separator 244 may include a cathode plate (CP), in which a channel is formed so that air containing oxygen may flow therethrough. In addition, each of the first and second separators 242 and 244 may form a channel through which a cooling medium may flow.

Further, the separators 242 and 244 may be formed of a graphite-based material, a composite graphite-based material, or a metal-based material. However, the embodiment is not limited to any specific material of the separators 242 and 244.

For example, each of the first and second separators 242 and 244 may include the first to third inflow communication portions IN1, IN2 and IN3 and the first to third outflow communication portions OUT1, OUT2 and OUT3.

That is, the reactant gases required for the membrane electrode assembly 210 may be introduced into the cell through the first and second inflow communication portions IN1 and IN2, and gas or liquid, in which the reactant gases humidified and supplied to the cell and the condensate water generated in the cell are combined, may be discharged to the outside of the fuel cell 100 through the first and second outflow communication portions OUT1 and OUT2.

Each of the first and second end plates 110A and 110B may be configured as a metal insert surrounded by a resin material. Here, the resin material may be a synthetic resin-rubber-based material or plastic, but the embodiment is not limited to any specific kind of resin material. The metal insert of each of the first and second end plates 110A and 110B may have high rigidity to withstand internal surface pressure, and may be formed by machining a metal material. For example, the first and second end plates 110A and 110B may be formed by combining a plurality of plates, but the embodiment is not limited to any specific configuration of the first and second end plates 110A and 110B.

In addition, the fuel cell 100 may further include a heater assembly. The heater assembly serves to raise the temperature of the cell stack 122 when starting the cell stack 122 in a cooled state. To this end, the heater assembly may include at least one of a first heater assembly 300A or a second heater assembly 300B. For example, as shown in FIG. 2, the heater assembly may include both the first heater assembly 300A and the second heater assembly 300B. The first heater assembly 300A may be disposed between the cell 122-1, which is located at one of the two end portions of the cell stack 122, and an inner surface 110A1 of the first end plate 110A, and the second heater assembly 300B may be disposed between the cell 122-N, which is located at the other one of the two end portions of the cell stack 122, and an inner surface 110BI of the second end plate 110B.

According to an embodiment, as shown in FIG. 2, each of the first and second heater assemblies 300A and 300B may include a current-collecting plate 340, a heating element (a heater or a planar heating element) 330, a pad (an insulation pad or a silicon pad) 320, and a heater plate (or a bypass plate) 310. In order to aid understanding the positions at which the current-collecting plate 340, the heating element 330, the pad 320, and the heater plate 310 are disposed, FIG. 2 schematically illustrates the current-collecting plate 340, the heating element 330, the pad 320, and the heater plate 310. The concrete configuration of each of these components 310 to 340 will be described later with reference to FIGS. 3 to 13.

According to another embodiment, unlike what is illustrated in FIG. 2, each of the first and second heater assemblies 300A and 300B may include a current-collecting plate 340, a heating element 330, a pad 320, and end plates 110A and 110B. That is, unlike the above embodiment, according to another embodiment, the first end plate 110A serves as a first heater plate 310 of the first heater assembly 300A, and the second end plate 110B serves as a second heater plate 310 of the second heater assembly 300B, so the heater plate 310 may be omitted from each of the first and second heater assemblies 300A and 300B. With this exception, since the first and second heater assemblies 300A and 300B according to another embodiment are the same as the first and second heater assemblies 300A and 300B according to the above embodiment, a duplicate description thereof will be omitted.

Hereinafter, the first and second heater assemblies 300A and 300B will be described with reference to FIG. 2. However, the description of the first and second heater assemblies 300A and 300B shown in FIG. 2 may also apply to the configuration in which each of the end plates 110A and 110B serves as the heater plate 310.

The current-collecting plate 340 may be disposed between each of the first and second end plates 110A and 110B, which face the cell stack 122, and the cell stack 122.

That is, the current-collecting plate 340 included in the first heater assembly 300A may be disposed between the heating element 330 and one (e.g. 122-1) of the two end portions of the cell stack 122. The current-collecting plate 340 included in the second heater assembly 300B may be disposed between the heating element 330 and the other one (e.g. 122-N) of the two end portions of the cell stack 122.

The current-collecting plate 340 serves to collect electrical energy generated by the flow of electrons in the cell stack 122 and to supply the same to a load of a vehicle in which the fuel cell 100 is used. For example, the current-collecting plate 340 may be implemented as a metal plate, which is made of an electrically conductive material, and may be in electrical contact with the cell stack 122.

The heating element 330 may be disposed between at least one of the two end portions of the cell stack 122 and the end plates 110A and 110B. For example, referring to FIG. 2, the heating element 330 of the first heater assembly 300A may be disposed between one (e.g. 122-1) of the two end portions of the cell stack 122 and the first end plate 110A, and the heating element 330 of the second heater assembly 300B may be disposed between the other one (e.g. 122-N) of the two end portions of the cell stack 122 and the second end plate 110B.

For example, the heating element 330 may include a heating part as an electrode, which is composed of a carbon paste, an aluminum, SUS, and a protective film part, which is configured by an insulative material such as a polyethylene terephthalate (PET) and SI. Here, the protective film may be disposed above and under the heating part.

In the heating element 330, the pattern of the heating part, which is composed of the carbon paste and the electrode, may be variously formed, and the heat density may be adjusted for each part by changing the pattern of the heating part. Further, the heating element 330 may be implemented as a planar heating element, for example, a polymer positive temperature coefficient (PTC) heating element. If moisture permeates the carbon paste exhibiting a PTC function for a long time, heating performance is deteriorated. In order to prevent permeation of moisture, a PET film is attached to the carbon paste and the electrode in order to enhance resistance to moisture.

In particular, the heating element 330 may be further provided with an aluminum thin film and a PET film, which exhibit high resistance to moisture. In this case, in order to prevent withstand voltage performance from being deteriorated by aluminum, which is conductive, the aluminum thin film may be manufactured to be smaller than the PET film, thereby improving not only moisture resistance characteristics but also withstand voltage characteristics.

Further, although not shown, thermal grease or a thermal pad may be interposed between the heating element 330 and the current-collecting plate 340 so as to be in close contact therewith. Due to the thermal pad or the thermal grease interposed between the heating element 330 and the current-collecting plate 340 in order to improve the heat conduction function, the heat generated from the heating element 330 may be well transferred to the reaction cell 122-n of the cell stack 122 via the current-collecting plate 340.

The pad 320 blocks the heat generated from the heating element 330 from traveling in the direction in which the cell stack 122 faces the end plates 110A and 110B, and causes a larger amount of heat to travel to the cell stack 122. In this way, the pad 320 may exhibit the thermal insulation function for preventing heat loss. In addition, the pad 320 may serve to buffer the clamping pressure of the cell stack 122. To this end, the pad 320 may be disposed between the end plates 110A and 110B and the heating element 330. For example, the pad 320 may be implemented as a foamed silicon sheet, and may prevent damage to the film-type heating element 330 when assembled with the heater plate 310 and the heating element 330 so as to be in close contact therewith in a stacking manner. However, the embodiment is not limited to any specific material of the pad 320. Alternatively, the pad 320 may be omitted from the fuel cell 100 according to the embodiment.

In addition, the pad 320 may include a through-hole TH (refer to FIG. 3 to be described later), which allows a first terminal unit T1 of the heater plate 310 and a second terminal unit T2 of the heating element 330 to be in contact with and connected to each other. This will be described later in greater detail with reference to the accompanying drawings.

The heater plate 310 is conceptually a dummy cell, which is a unit cell disposed at the outermost position in the direction in which the unit cells 122-n are stacked in the cell stack 122. The heater plate 310 may be formed in a plate shape corresponding to the external shape of the unit cells 122-n.

The heater plate 310 may have communication portions penetrating both side surfaces thereof in the first direction, for example, first and second inflow communication portions IN1 and IN2 and first and second outflow communication portions OUT1 and OUT2.

Further, the heater plate 310 may be implemented as a single plate, as shown in the drawings.

Alternatively, unlike what is illustrated, the heater plate 310 may be configured such that a plurality of unit heater plates, e.g. three unit heater plates, is stacked in the first direction. Similar to the membrane electrode assembly 210 in which the fuel electrode 214, the polymer electrolyte membrane 212, and the air electrode 216 are assembled into an integral form, the three unit heater plates constituting the heater plate 310 may be stacked in the first direction.

The heater plate 310 may be disposed at at least one of the two end portions 122-1 and 122-N of the cell stack 122. For example, as shown in FIG. 2, the first heater plate 310 of the first heater assembly 300A may be disposed between the first end plate 110A and one (e.g. 122-1) of the two end portions of the cell stack 122, and the second heater plate 310 of the second heater assembly 300B may be disposed between the second end plate 110B and the other one (e.g. 122-N) of the two end portions of the cell stack 122.

Further, the heater plate 310 may be configured such that a metallic pipe is integrally formed with a plastic body through an insert injection molding method, and the pipe may form a flow channel (e.g. a hydrogen channel and an oxygen channel). However, the embodiment is not limited to any specific material of the heater plate 310.

Hereinafter, an embodiment of each of the first and second heater assemblies 300A and 300B will be described in more detail with reference to the accompanying drawings.

Figure 3:
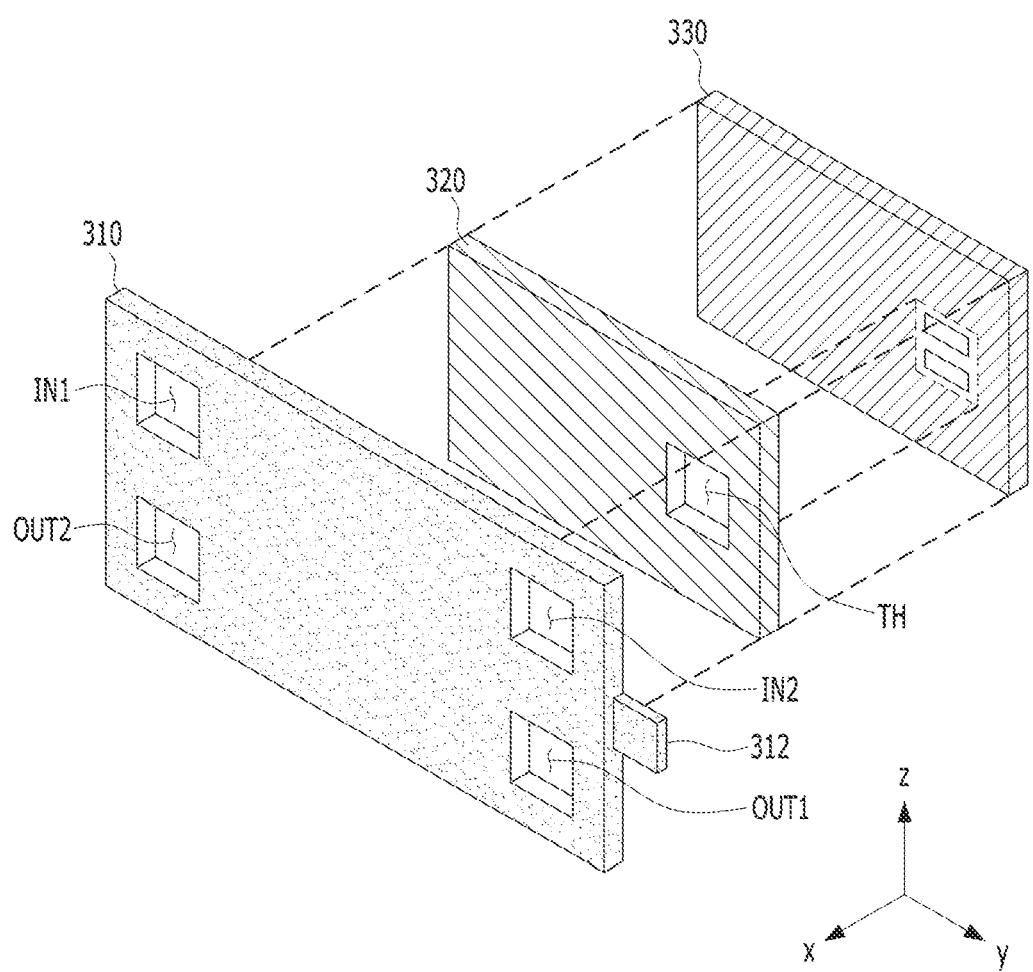
FIG. 3 is an exploded perspective view of a heater assembly according to an embodiment.
Figure 4A:
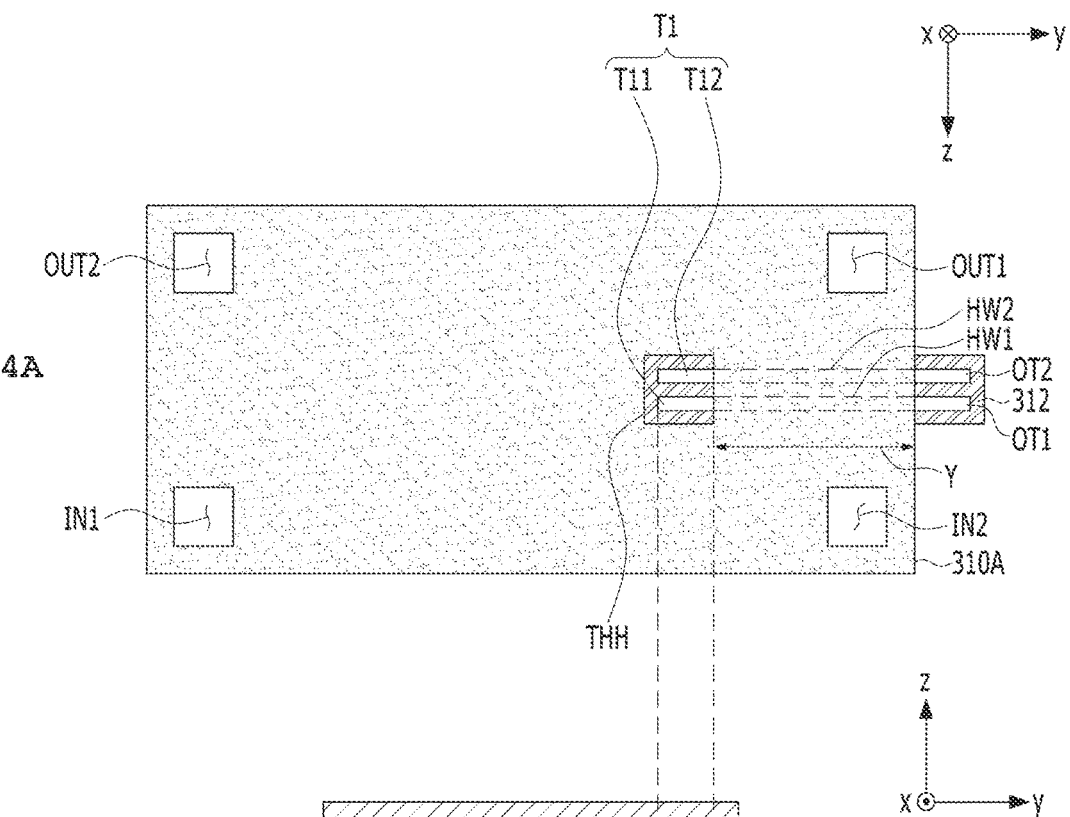
FIG. 4A shows the configuration of an example of a heater plate according to an embodiment and FIG. 4B shows the configuration of a heating element according to an embodiment.
Figure 4B:
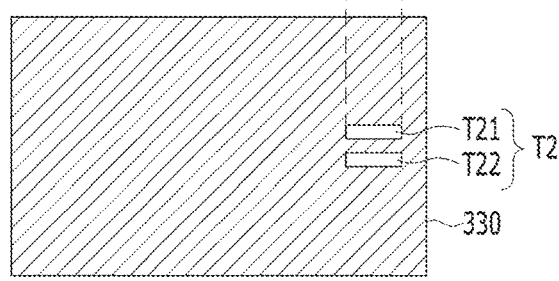

FIG. 3 is an exploded perspective view of a heater assembly according to an embodiment, FIG. 4A shows the configuration of an example 310A of the heater plate 310 according to an embodiment, and FIG. 4B shows the configuration of a heating element 330 according to an embodiment. The current-collecting plate 340 is not illustrated in FIG. 3.

The heater plate 310A may include a first terminal unit T1, and the heating element 330 may include a second terminal unit T2.

As shown in FIG. 4A, the first terminal unit T1 may have a shape protruding in the second direction, intersecting the first direction, and, as shown in FIG. 4B, the second terminal unit T2 may be engaged with the first terminal unit Ti in the second direction.

Figure 5:
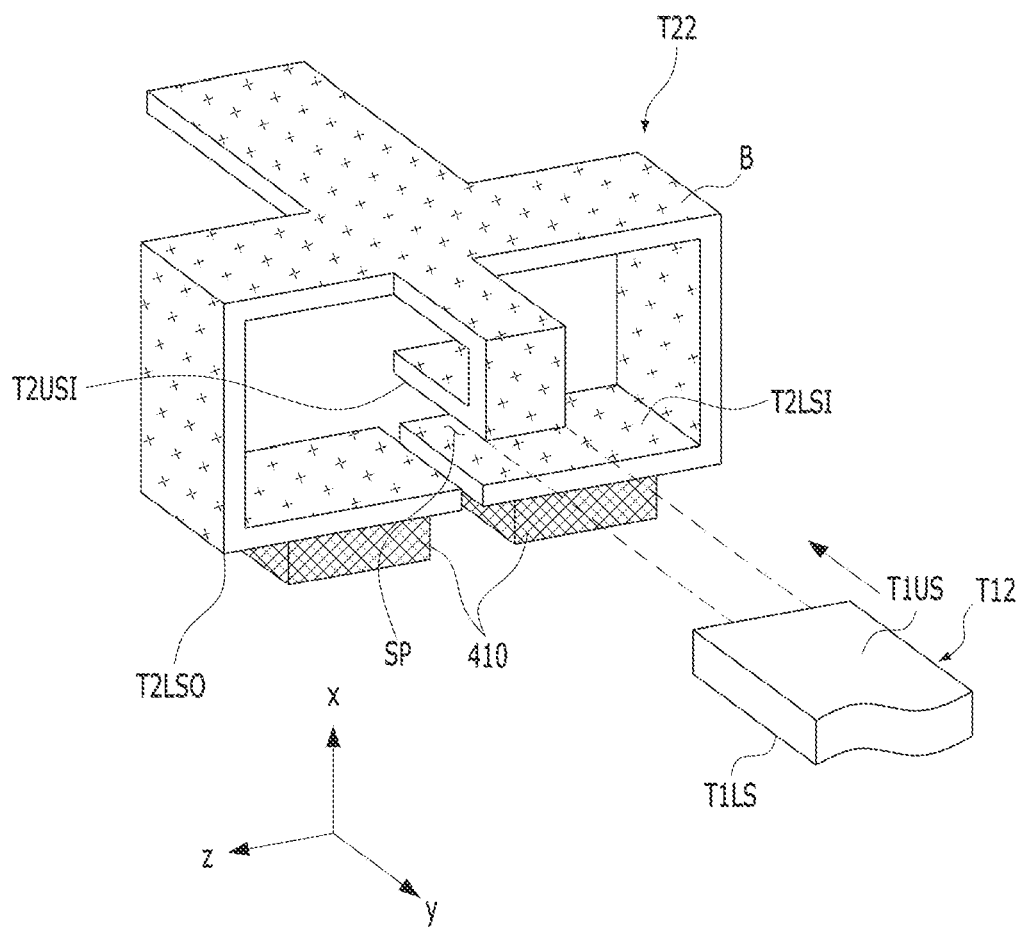
FIG. 5 is an exploded perspective view of a first terminal unit and a second terminal unit according to an embodiment.
Figure 6:
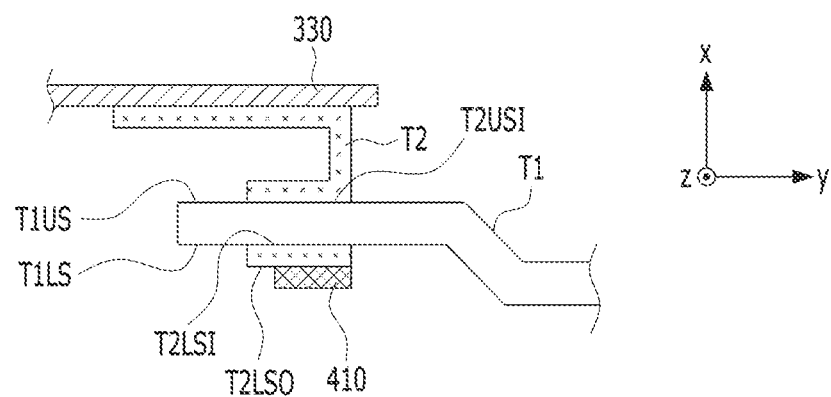
FIG. 6 is a partial cross-sectional view showing the state in which the first terminal unit and the second terminal unit according to an embodiment are engaged with each other normally.
Figure 7:
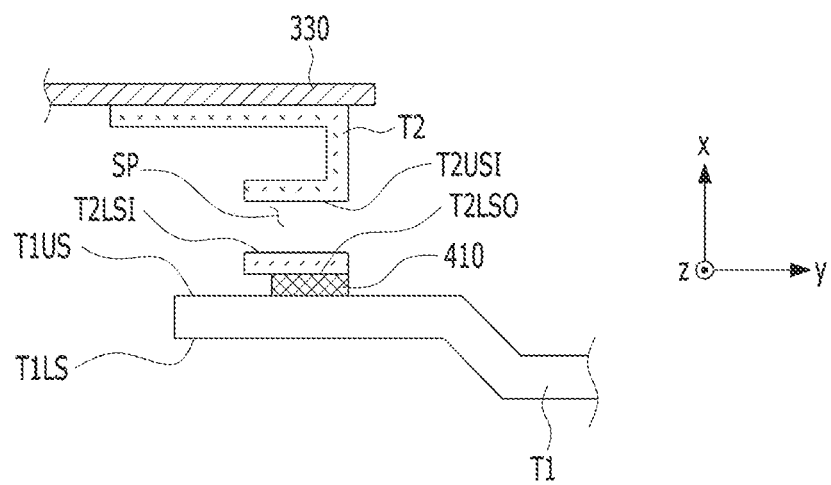
FIG. 7 is a partial cross-sectional view showing the state in which the first terminal unit and the second terminal unit according to an embodiment are engaged with each other abnormally.
Figure 8:
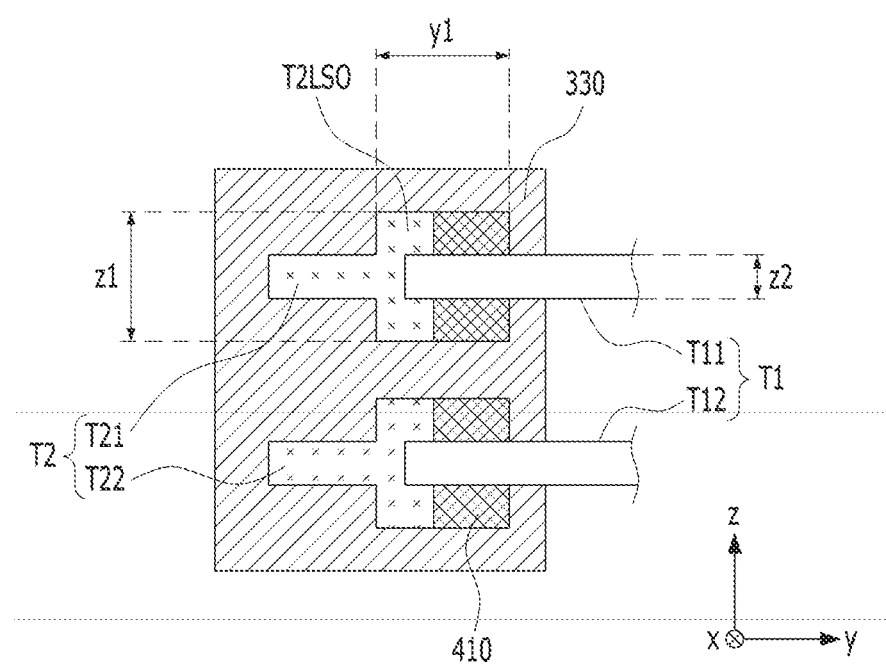
FIG. 8 shows the engaged state of the first terminal unit and the second terminal unit according to an embodiment.

FIG. 5 is an exploded perspective view of the first terminal unit T1 (T12) and the second terminal unit T2 (T22) according to an embodiment, FIG. 6 is a partial cross-sectional view showing the state in which the first terminal unit T1 and the second terminal unit T2 according to the embodiment are engaged (or assembled) with each other normally, FIG. 7 is a partial cross-sectional view showing the state in which the first terminal unit T1 and the second terminal unit T2 according to the embodiment are engaged (or assembled) with each other abnormally, and FIG. 8 shows the engaged state of the first terminal unit T1 and the second terminal unit T2 according to the embodiment.

One of the first and second terminal units T1 and T2 may include a pair of male heater terminals protruding in the second direction, and the other one of the first and second terminal units T1 and T2 may include a pair of female heater terminals into which the pair of male heater terminals is inserted.

Hereinafter, a configuration in which the first terminal unit T1 includes a pair of male heater terminals T11 and T12 and the second terminal unit T2 includes a pair of female heater terminals T21 and T22 will be described. However, the following description may also apply to the case in which the first terminal unit T1 includes a pair of female heater terminals and the second terminal unit T2 includes a pair of male heater terminals.

According to the embodiment, each of the pair of female heater terminals T2 (T21 and T22) may include a body B forming a space into which a respective one of the pair of male heater terminals T1 (T11 and T12) is inserted. For example, referring to FIG. 5, one T22 of the pair of female heater terminals T2 (T21 and T22) may include a body B forming a space SP into which one T12 of the pair of male heater terminals T1 (T11 and T12) is inserted.

Identically to what is illustrated in FIG. 5, the other one T21 of the pair of female heater terminals T2 (T21 and T22) may include a body B forming a space SP into which the other one T11 of the pair of male heater terminals T1 (T11 and T12) is inserted.

As shown in FIG. 4A, a terminal-mounting hole THH may expose the first terminal unit T1 (T11 and T12). The second terminal unit T2 may be engaged with the first terminal unit T1 in the terminal-mounting hole THH, and may be fixed therein.

Each of the pair of male heater terminals T11 and T12 may include an upper surface T1US and a lower surface T1LS.

Each of the pair of male heater terminals T11 and T12 may include an upper surface T1US and a lower surface T1LS. When each of the pair of male heater terminals T11 and T12 is inserted into the space SP in a respective one of the pair of female heater terminals T21 and T22, the surface of each of the pair of male heater terminals T11 and T12 that comes into contact with the inner upper surface T2USI of the body B forming the space SP corresponds to the upper surface T1US, and the surface thereof that comes into contact with the inner lower surface T2LSI of the body B forming the space SP and is formed opposite the upper surface T1US corresponds to the lower surface T1LS.

In addition, each of the pair of male heater terminals T11 and T12 may include a first portion, which is in contact with a respective one of the pair of female heater terminals T21 and T22 in the state of not being inserted into the space SP in a respective one of the pair of female heater terminals T21 and T22. In addition, each of the pair of female heater terminals T21 and T22 may include a second portion, which is in contact with the first portion of a respective one of the pair of male heater terminals T11 and T12.

According to an embodiment, the fuel cell 100 may further include an insulation part. The insulation part may be disposed on at least one of the first portion or the second portion.

According to an embodiment, as illustrated in FIGS. 5 to 8, an insulation part 410 may be disposed on an outer lower surface T2LSO of the body B, which is formed opposite the inner lower surface T2LSI of the body B. In this case, the upper surface T1US of each of the pair of male heater terminals T11 and T12 may correspond to the first portion, and the outer lower surface T2LSO of the body B may correspond to the second portion.

According to another embodiment, an insulation part 410 may be disposed on the upper surface T1US of each of the pair of male heater terminals T11 and T12, which may be in contact with a respective one of the pair of female heater terminals T21 and T22 in the state in which each of the pair of male heater terminals T11 and T12 is not inserted into the space SP in a respective one of the pair of female heater terminals T21 and T22. In this case, the upper surface T1US of each of the pair of male heater terminals T11 and T12 may correspond to the first portion, and the outer lower surface T2LSO of the body B may correspond to the second portion.

The planar area A1 of the outer lower surface T2LSO of the body B (hereinafter referred to as a "first planar area") may be greater than or less than the planar area A2 of the upper surface T1US of each of the pair of male heater terminals T11 and T12 (hereinafter referred to as a "second planar area"). In this case, the insulation part 410 may be disposed on the portion having a larger area among the first planar area and the second planar area.

The first planar area A1 may be expressed using Equation 1 below, and the second planar area A2 may be expressed using Equation 2 below.

$$A1 = y1 \times z1 \quad \text{[Equation 1]}$$

$$A2 = y2 \times z2 \quad \text{[Equation 2]}$$

Here, y1 represents the length of the outer lower surface T2LSO of the body B in the second direction, y2 represents the length of the upper surface T1US of each of the pair of male heater terminals T11 and T12 in the second direction, z1 represents the width of the outer lower surface T2LSO of the body B in the third direction, and z2 represents the width of the upper surface T1US of each of the pair of male heater terminals T11 and T12 in the third direction.

For example, when y1 and y2 are the same and z1 is greater than z2 as shown in FIG. 8, the first planar area A1 is greater than the second planar area A2. Therefore, the insulation part 410 may be disposed on the outer lower surface T2LSO of the body B, having the first planar area A1, which is greater than the second planar area A2.

Alternatively, when y1 and y2 are the same and z2 is greater than z1 unlike what is illustrated in FIG. 8, the second planar area A2 is greater than the first planar area A1. Therefore, the insulation part 410 may be disposed on the upper surface T1US of each of the pair of male heater terminals T11 and T12, having the second planar area A2, which is greater than the first planar area A1.

Figure 9:
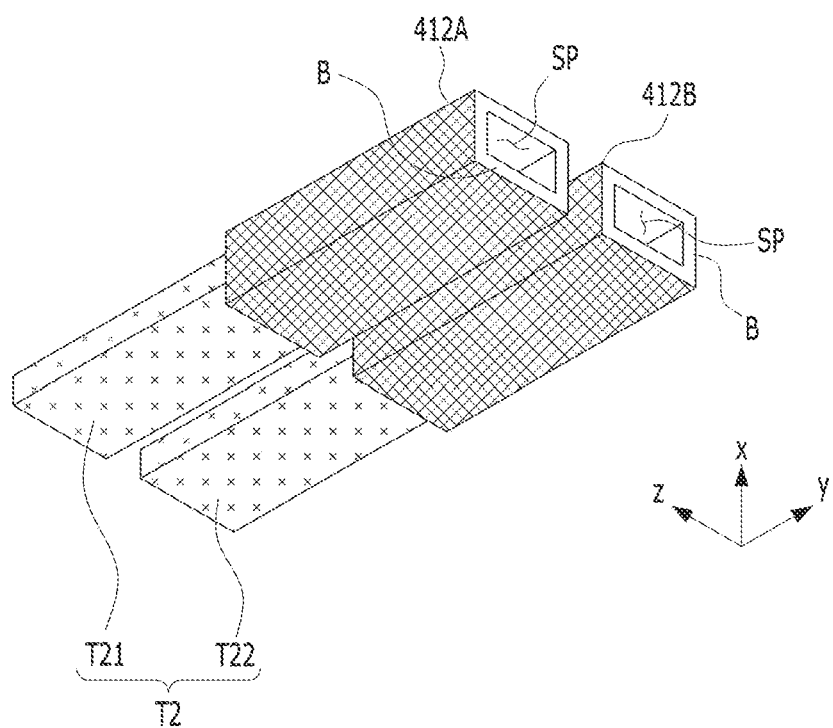
FIG. 9 is a perspective view of an insulation part according to another embodiment.

FIG. 9 is a perspective view of an insulation part according to another embodiment.

As shown in FIG. 9, the insulation part may include insulation tubes 412A and 412B.

Each of the insulation tubes 412A and 412B may be formed in the shape of a tube surrounding the outer surface of the body B forming the space SP.

The insulation part 410 and the insulation tubes 412A and 412B may be made of an insulative material. For example, the insulation part 410 and the insulation tubes 412A and 412B may have a surface coated or taped with an insulative material. However, the embodiment is not limited to any specific insulative material of the insulation part 410 and the insulation tubes 412A and 412B. Also, the embodiment is not limited to any specific arrangement form of the insulation part 410.

Hereinafter, a fuel cell 100 according to another embodiment will be described with reference to the accompanying drawings.

Figure 10:
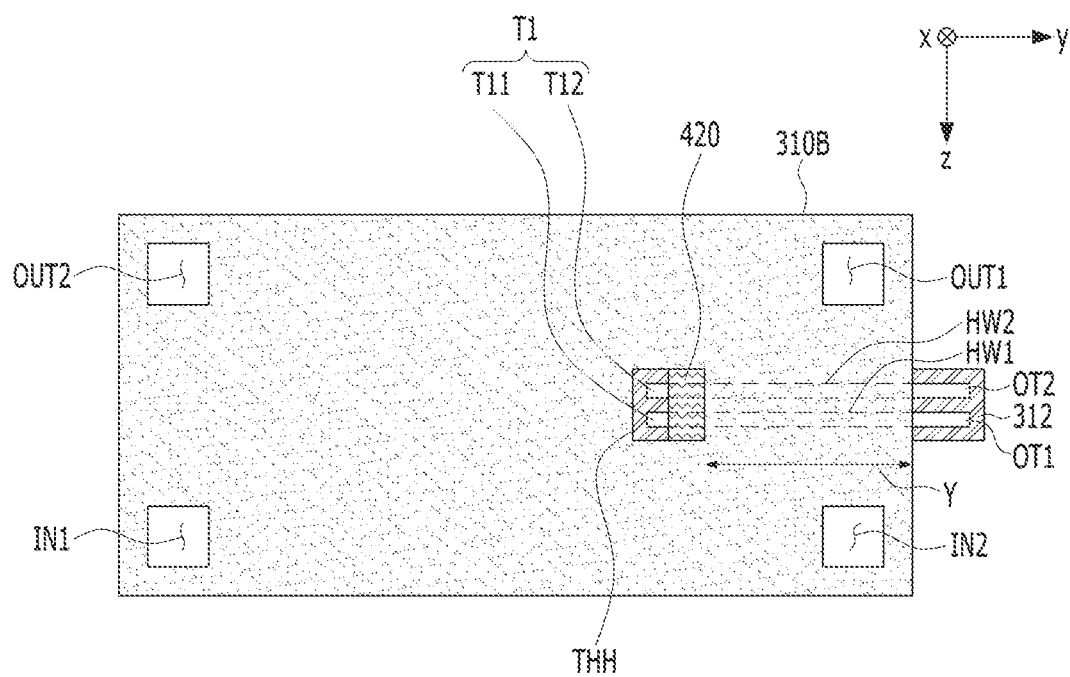
FIG. 10 shows the configuration of a fuel cell according to another embodiment.

FIG. 10 shows the configuration of a fuel cell 100 according to another embodiment.

Unlike what is illustrated in FIG. 9, the fuel cell 100 shown in FIG. 10 may further include an engagement guide member 420. With this exception, since the fuel cell 100 shown in FIG. 10 is the same as the fuel cell shown in FIG. 4A, the same parts as shown in FIG. 4A are denoted by the same reference numerals, and a duplicate description thereof will be omitted.

In addition, the fuel cell 100 according to another embodiment shown in FIG. 10 may include an insulation part 410 (refer to FIG. 18 to be described later), like the fuel cell according to the embodiment shown in FIGS. 4A and 4B. Alternatively, the fuel cell 100 according to another embodiment shown in FIG. 10 may not include an insulation part 410, unlike the fuel cell according to the embodiment shown in FIGS. 4A and 4B.

According to another embodiment, the heater plate 310B may further include an engagement guide member 420 as well as a terminal-mounting hole THH.

The engagement guide member 420 may have a shape that at least partially overlaps the terminal-mounting hole THH in the first direction and protrudes toward the terminal-mounting hole THH in the second direction.

At least a portion of the engagement guide member 420 may overlap the upper surface T1US of each of the pair of male heater terminals T1. (T11 and T12) in the first direction.

Further, the engagement guide member 420 may be disposed between the current-collecting plate 340 and the first terminal unit T1 (T11 and T12).

Figure 18:
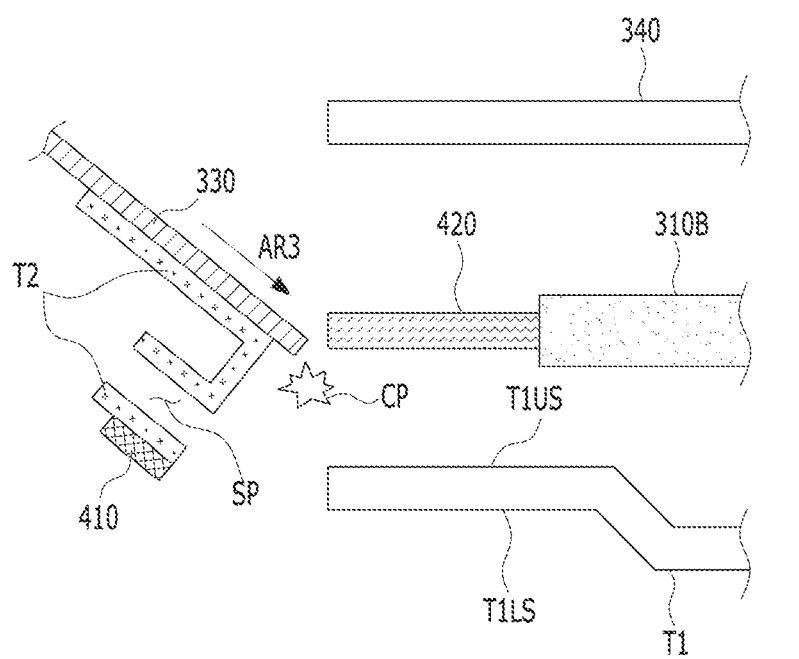
FIG. 18 is a view showing a method of assembling the fuel cell shown in FIG. 10.

Alternatively, unlike what is illustrated in FIG. 10 or FIG. 18 to be described later, the engagement guide member 420 may be disposed on the heating element 330, rather than on the heater plate 310B.

In order to allow the second terminal unit T2 to be inserted through the terminal-mounting hole THH and to be assembled with the first terminal unit T1 normally, as shown in FIG. 6, the engagement guide member 420 may be formed so as to expose the pair of male heater terminals T11 and T12 of the first terminal unit T1 in parallel, as shown in FIG. 10. That is, the planar area of the engagement guide member 420 may be smaller than the planar area of the terminal-mounting hole THH, and the engagement guide member 420 may be disposed so as to expose the end portions of the pair of male heater terminals T11 and T12 in parallel in one direction.

Further, the engagement guide member 420 may be made of a transparent material. For example, the engagement guide member 420 may be implemented as a PET film in order to enable an assembly worker to check the assembled state of the first terminal unit T1 and the second terminal unit T2 in the terminal-mounting hole THH with the naked eye during an assembly process.

Figure 11:
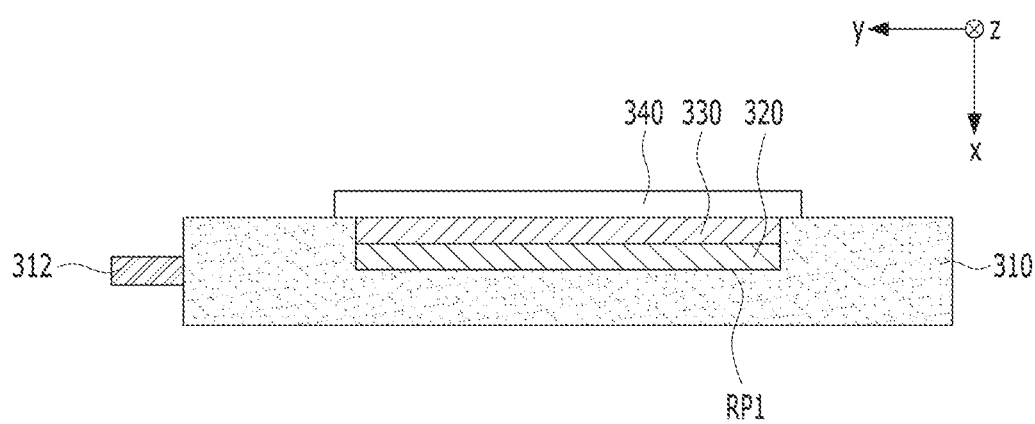
FIG. 11 is a cross-sectional view of an example of each of the first and second heater assemblies shown in FIG. 2.

FIG. 11 is a cross-sectional view of an example of each of the first and second heater assemblies 300A and 300B shown in FIG. 2.

Figure 12:
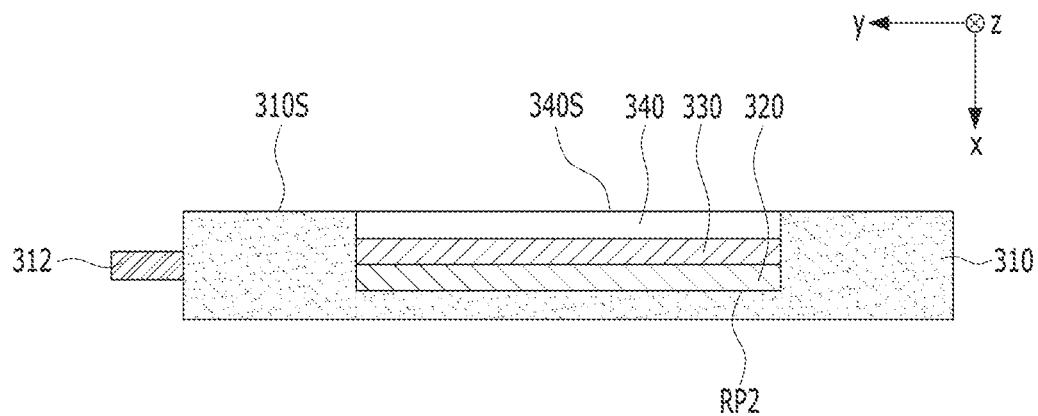
FIG. 12 is a cross-sectional view of another example of each of the first and second heater assemblies shown in FIG. 2.

FIG. 12 is a cross-sectional view of another example of each of the first and second heater assemblies 300A and 300B shown in FIG. 2.

According to an embodiment, the heater plate 310 may include a concave portion (or a seating recess) RP1 or RP2. The concave portion RP1 or RP2 may have a cross-sectional shape that faces the cell stack 122 and is concavely recessed so that at least one of the pad 320 or the heating element 330 is inserted, seated, and received therein. For example, as shown in FIGS. 11 and 12, both the pad 320 and the heating element 330 may be seated and received in the concave portion RP1 or RP2.

According to an embodiment, the current-collecting plate 340 may be stacked over the concave portion RP1, as illustrated in FIG. 11. According to another embodiment, the current-collecting plate 340 may be received in the concave portion RP2, as illustrated in FIG. 12. For example, the outer surface 340S of the current-collecting plate 340 received in the concave portion RP2 and the surface 310S of the heater plate 310 around the concave portion RP2 may be located in the same horizontal plane. The reason for this is to secure close electrical contact between the current-collecting plate 340 and the cell stack 122 when the heater assemblies 300A and 300B are tightly coupled to the two end portions of the cell stack 122.

As illustrated in FIG. 11, since the pad 320 and the heating element 330 are seated and received in the concave portion RP1, it is possible to easily mount these components 320 and 330 to a fixed position and to prevent separation thereof after assembly. Alternatively, as illustrated in FIG. 12, since the pad 320, the heating element 330, and the current-collecting plate 340 are seated and received in the concave portion RP2, it is possible to easily mount these components 320, 330 and 340 to a fixed position and to prevent separation thereof after assembly.

Hereinafter, a method of assembling some components of the fuel cell 100 according to the embodiment described above will be described with reference to FIGS. 13 and 6.

Figure 13:
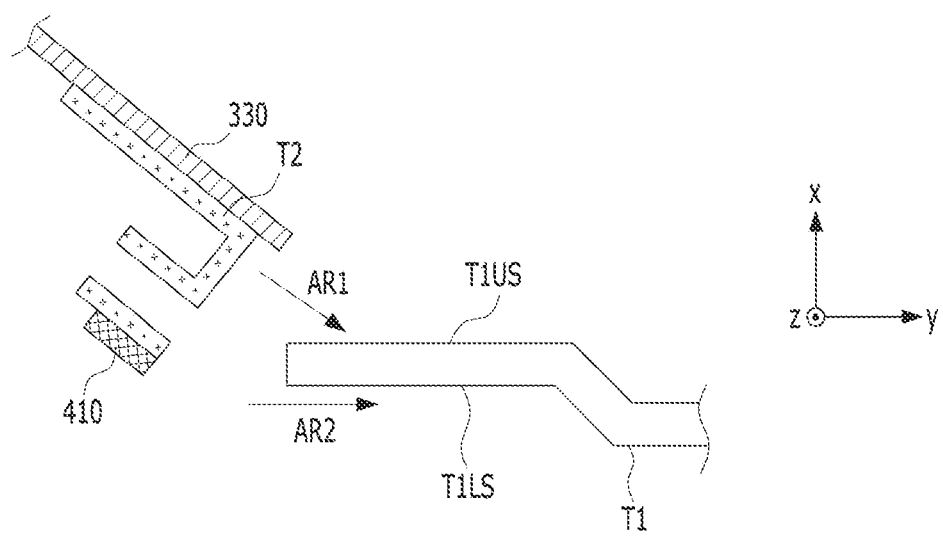
FIG. 13 is a cross-sectional view showing a method of assembling some components of the fuel cell according to an embodiment.

FIG. 13 is a cross-sectional view showing a method of assembling some components of the fuel cell 100 according to an embodiment.

Referring to FIG. 13, a pair of female heater terminals T2 is moved in the direction indicated by the first arrow AR1.

Thereafter, referring to FIG. 13, the pair of female heater terminals T2, which has been moved in the direction indicated by the first arrow AR1, is moved in the direction indicated by the second arrow AR2, i.e. the second direction perpendicular to the first direction, so each of the pair of male heater terminals T11 and T12 is inserted into the space SP in a respective one of the pair of female heater terminals T21 and T22, as shown in FIG. 6.

In this way, when the pair of female heater terminals T2 and the pair of male heater terminals T1 are engaged in the second direction perpendicular to the first direction, the thickness of the fuel cell 100 in the first direction, which is the stacking direction of the cell stack 122, may be minimized.

According to the embodiment, the heater plate 310A or 310B may further include a heater wiring connector (or a power connector) 312 and wires HW1 and HW2.

The heater wiring connector 312 may receive a driving signal (voltage or current) required to drive the heating element 330 from the outside of the heater plate 310 (310A and 310B) (e.g. the cell stack 122), and may supply the received driving signal to the first terminal unit T1 via the wires HW1 and HW2.

To this end, the heater wiring connector 312 may protrude in a flat shape from the heater plate 310A or 310B in the second direction. Alternatively, the heater wiring connector 312 may protrude in a flat shape in the second direction and may then bend in the first direction. However, the fuel cell 100 according to the embodiment is not limited to any specific shape of the heater wiring connector 312.

The wires HW1 and HW2 may serve to connect the first terminal units T1 (T11 and T12) to the heater wiring connector 312. To this end, the wires HW1 and HW2 may be disposed in a predetermined section Y within the heater plate 310A or 310B, and may include portions OT1 and OT2 that extend to the heater wiring connector 312.

The first wire HW1 may serve to connect the first terminal unit T1 (T11) to the heater wiring connector 312. The second wire HW2 may serve to connect the first terminal unit T1 (T12) to the heater wiring connector 312. That is, one of the two end portions of the first wire HW1 may be connected to the first terminal unit T11, and the other one of the two end portions of the first wire HW1 may be connected to the heater wiring connector 312. One of the two end portions of the second wire HW2 may be connected to the first terminal unit T12, and the other one of the two end portions of the second wire HW2 may be connected to the heater wiring connector 312.

Alternatively, the wires HW1 and HW2 may be omitted. In this case, the first terminal units T1 (T11 and T12) may be directly connected to the heater wiring connector 312.

Hereinafter, a vehicle including the fuel cell according to the embodiment will be described with reference to the accompanying drawings.

Figure 14:
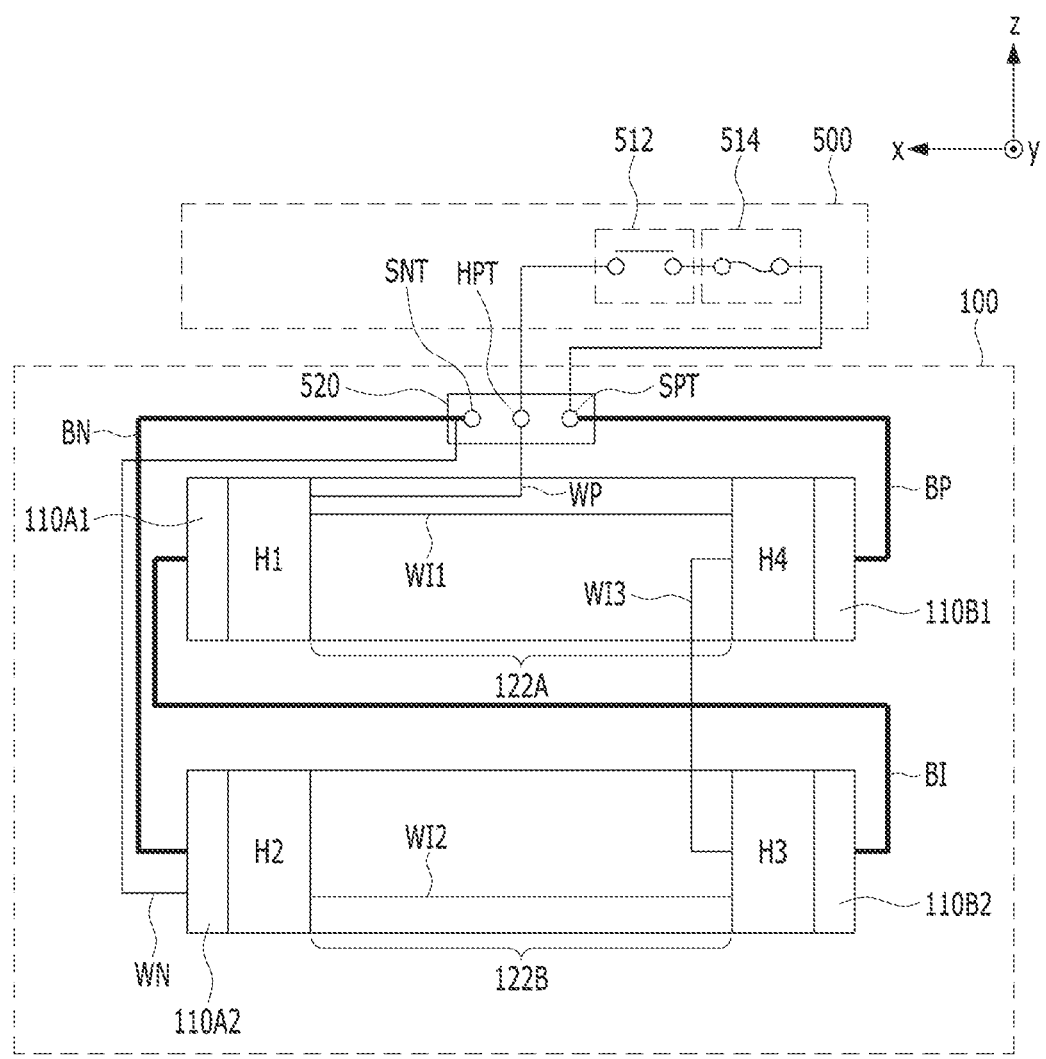
FIG. 14 is a block diagram of an example of a vehicle including the fuel cell according to an embodiment.
Figure 15:
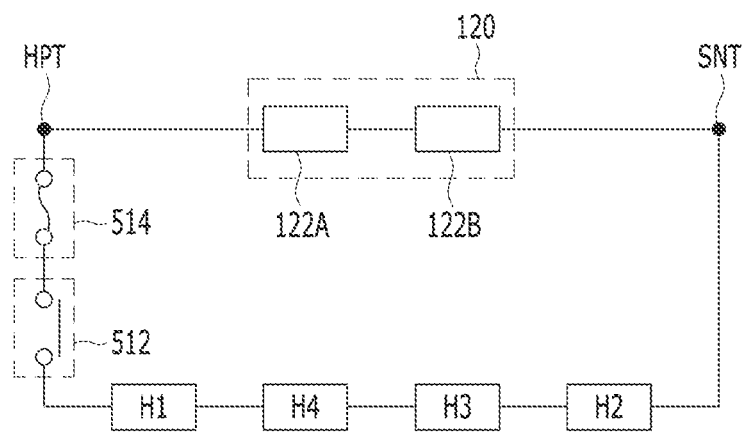
FIG. 15 is a circuit diagram of the vehicle shown in FIG. 14.

FIG. 14 is a block diagram of an example of a vehicle including the fuel cell according to the embodiment, and FIG. 15 is a circuit diagram of the vehicle shown in FIG. 14.

Like the above-described embodiment, when the fuel cell 100 includes one cell stack 122, an element for supplying a driving signal (e.g. a stack bus bar (not shown) connected to the cell stack 122) may be directly connected to the heater wiring connector 312 shown in FIG. 4 or FIG. 10, so the heater plate 310A or 310B may receive a driving signal. The received driving signal may be transmitted to the heating element 330 via the wires HW1 and HW2 connected to the heater wiring connector 312, the first terminal units T1 (T11 and T12) connected to the wires HW1 and HW2, and the second terminal units T2 (T21 and T22) electrically connected to the first terminal units T1 (T11 and T12), so the heating element 330 may generate heat to thereby heat the cell stack 122.

Alternatively, unlike the above-described embodiment, the fuel cell 100 may include a plurality of cell stacks 120 (122A and 122B). Referring to FIG. 14, two cell stacks 122A and 122B are stacked in the third direction.

The fuel cell vehicle shown in FIG. 14 may include a fuel cell 100 and a junction box (or a high-voltage junction box) 500.

The fuel cell 100 may include two cell stacks 122A and 122B, first to fourth heaters H1, H2, H3 and H4, first to fourth end plates 110A1, 110A2, 110B2 and 110B1, a terminal block 520, a positive bus bar BP, a negative bus bar BN, a positive wire WP, a negative wire WN, an intermediate bus bar BI, and intermediate wires WI1 and WI2.

The first and fourth heaters H1 and H4 may be disposed at respective end portions of the first cell stack 122A, and the second and third heaters $H_3$ and $H_4$ may be disposed at respective end portions of the second cell stack 122B.

The first and fourth heaters H1 and H4 may have the same configuration as and perform the same operation as the first and second heater assemblies 300A and 300B shown in FIG. 2, respectively. The second and third heaters H2 and H3 may have the same configuration as and perform the same operation as the first and second heater assemblies 300A and 300B shown in FIG. 2, respectively. Therefore, a description of each of the first to fourth heaters H1, H2, H3 and H4 will be omitted.

Further, the first and fourth end plates 110A1 and 110B1 may have the same configuration as and perform the same operation as the first and second end plates 110A and 110B shown in FIG. 2, respectively. The second and third end plates 110A2 and 110B2 may have the same configuration as and perform the same operation as the first and second end plates 110A and 110B shown in FIG. 2, respectively. Therefore, a description of each of the first to fourth end plates 110A1, 110A2, 110B2 and 110B1 will be omitted.

The first and second cell stacks 122A and 122B may be electrically connected to each other. For example, the intermediate bus bar BI may be disposed between the first and second cell stacks 122A and 122B in order to electrically connect the same.

As illustrated, when the fuel cell 100 includes a plurality of cell stacks (e.g. 122A and 122B), a plurality of third and fourth heaters $H_3$ and $H_4$ may be disposed between the first and second heaters H1 and H2.

The terminal block 520 serves to electrically connect the current-collecting plate 340 and the first to fourth heaters H1, H2, H3 and H4 to the junction box 500. For example, the terminal block 520 may protrude from the upper surface of the fuel cell 100 toward the junction box 500 so as to be electrically connected to the junction box 500.

The terminal block 520 may include a positive bus terminal SPT, a negative bus terminal SNT, and a positive heater terminal HPT.

The positive bus terminal SPT may be connected to the positive bus bar BP, the negative bus terminal SNT may be connected to the negative bus bar BN, the positive heater terminal HPT may be connected to the positive wire WP, and the negative bus terminal SNT may be connected to the negative wire WN. To this end, conductive wires may also be disposed in the terminal block 520.

In this case, for convenience of description, the current-collecting plate that is in contact with the first heater H1 is referred to as a 'first current-collecting plate', the current-collecting plate that is in contact with the second heater H2 is referred to as a 'second current-collecting plate', the current-collecting plate that is in contact with the third heater $H_3$ is referred to as a 'third current-collecting plate', and the current-collecting plate that is in contact with the fourth heater H4 is referred to as a 'fourth current-collecting plate'.

In this case, the negative bus bar BN may electrically connect the second current-collecting plate to the negative bus terminal SNT of the terminal block 520, and the positive bus bar BP may electrically connect the fourth current-collecting plate to the positive bus terminal SPT of the terminal block 520.

In addition, the positive wire WP may electrically connect the first heater H1 to the positive heater terminal HPT of the terminal block 520, and the negative wire WN may electrically connect the second heater H2 to the negative bus terminal SNT of the terminal block 520.

The three intermediate wires WI1, WI2 and WI3 may electrically connect the heaters of the two cell stacks 122A and 122B to each other. Specifically, the first intermediate wire WI1 may connect the first heater H1 and the fourth heater H4 to each other. The second intermediate wire WI2 may connect the second heater H2 and the third heater H3 to each other. The third intermediate wire WI3 may connect the third heater H3 and the fourth heater H4 to each other.

The junction box 500 may be disposed above the stacked cell stacks 120 (122A and 122B). The current-collecting plate 340 may collect the electrical energy generated by the flow of electrons in the cell stacks 120, and may transfer the same to the junction box 500. The power transferred to the junction box 500 may be supplied to a load of a vehicle that uses the fuel cell 100.

The junction box 500 may serve to receive and distribute the power generated by the fuel cell 100. To this end, the junction box 500 may be electrically connected to the fuel cell 100 via the terminal block 520.

In addition, the junction box 500 may include a switching unit. The switching unit may be disposed between the positive wire WP and the positive bus bar BP. The switching unit may include a switch 512 and a fuse 514. Referring to FIG. 15, when the switching unit is switched on, that is, when the switch 512 is switched on, current may be supplied to the first to fourth heaters H1, H2, H3 and H4 to form a closed loop, whereby the first to fourth heaters H1, H2, H3 and H4 may generate heat.

Hereinafter, a fuel cell according to a comparative example and the fuel cell according to an embodiment will be described with reference to the accompanying drawings.

Figure 16:
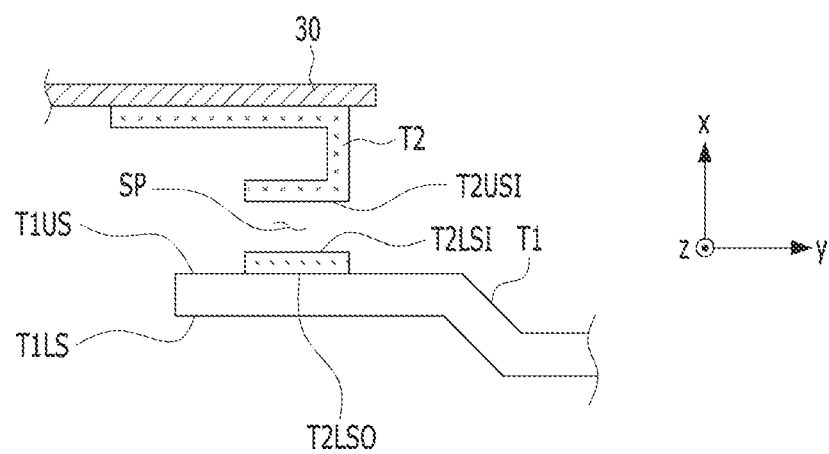
FIG. 16 is a cross-sectional view showing a part of a fuel cell according to a comparative example.
Figure 17:
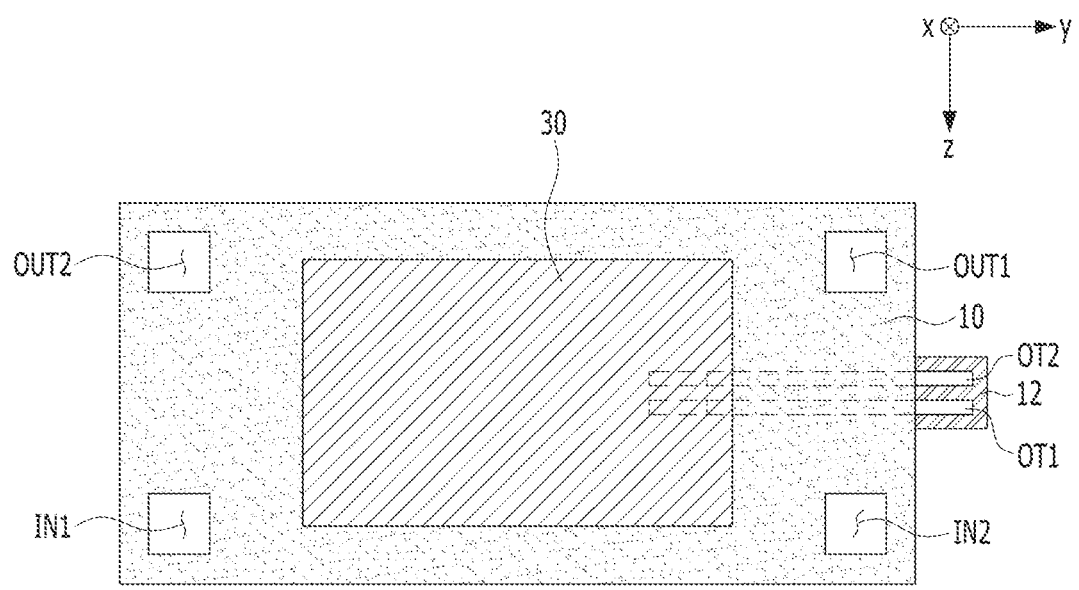
FIG. 17 shows the state in which a heating element is assembled with a heater plate in the fuel cell shown in FIG. 16.

FIG. 16 is a cross-sectional view showing a part of a fuel cell according to a comparative example, and FIG. 17 shows the state in which a heating element 30 is assembled with a heater plate 10 in the fuel cell shown in FIG. 16.

The heater plate 10, the heater wiring connector 12, the heating element 30, the first terminal unit T1, and the second terminal unit T2 shown in FIGS. 16 and 17 perform the same functions as the heater plate 310, the heater wiring connector 312, the heating element 330, the first terminal unit T1, and the second terminal unit T2 according to the embodiment, respectively. Therefore, duplicate descriptions of these components 10, 12 and 30 will be omitted. In addition, reference numerals SP, T1US, TILS, T2USI, T2LSI and T2LSO shown in FIGS. 16 and 17 correspond to reference numerals SP, T1US, TILS, T2USI, T2LSI and T2LSO used to describe the fuel cell according to the above-described embodiment, respectively.

As shown in FIG. 16, the fuel cell according to the comparative example does not include the insulation part 410, unlike the fuel cell 100 according to the embodiment.

In this case, when the second terminal unit T2 is moved in the direction indicated by the first arrow AR1 shown in FIG. 13, each of the pair of male heater terminals of the first terminal unit T1 may not be inserted into the space SP in a respective one of the pair of female heater terminals of the second terminal unit T2, as shown in FIG. 16. For example, as shown in FIG. 16, the pair of male heater terminals T1 and the pair of female heater terminals T2 may be in electrical contact with each other in the state that the outer lower surface T2LSO of each of the pair of female heater terminals T2 is laid on the upper surface T1US of a respective one of the pair of male heater terminals T1.

Only when each of the pair of male heater terminals of the first terminal unit T1 is inserted into the space SP in a respective one of the pair of female heater terminals of the second terminal unit T2, current is applied from the first terminal unit T1 to the second terminal unit T2, whereby the heating element 30 is capable of generating heat. However, as shown in FIG. 16, in the state in which each of the pair of male heater terminals of the first terminal unit T1 is not inserted into the space SP in a respective one of the pair of female heater terminals of the second terminal unit T2, current is not applied from the first terminal unit T1 to the second terminal unit T2.

As illustrated in FIG. 16, incorrect assembly (hereinafter referred to as 'misassembly') between the first terminal unit T1 and the second terminal unit T2 may be determined by measuring the resistance value between the two terminals OT1 and OT2 of the heater wiring connector 12 shown in FIG. 17. However, as shown in FIG. 16, even if each of the pair of male heater terminals of the first terminal unit T1 is not inserted into the space SP in a respective one of the pair of female heater terminals of the second terminal unit T2, when the upper surface T1US of each of the pair of male heater terminals T1 is in contact with the outer lower surface T2LSO of a respective one of the pair of female heater terminals T2, the resistance value between the terminals OT1 and OT2 may be measured to be normal (e.g. several tens ohms (Ω)), so it is not possible to accurately determine misassembly in the comparative example. As such, if misassembly between the first terminal unit T1 and the second terminal unit T2 is not determined, the fuel cell may be overheated, and the surface contact area between the heater plate 10 and the pad (the member corresponding to the component 320 of the embodiment) is not sufficiently secured, so a seal against external moisture and external air may be deteriorated.

In contrast, the fuel cell 100 according to the embodiment includes the insulation part 410 disposed on at least one of the first portion of the first terminal unit T1 (e.g. the upper surface T1US of each of the pair of male heater terminals T1) or the second portion of the second terminal unit T2 (e.g. the outer lower surface T2LSO of each of the pair of female heater terminals T2). Therefore, in the misassembled state shown in FIG. 16, since the insulation part 410 blocks electrical contact between the upper surface T1US of each of the pair of male heater terminals T1 and the outer lower surface T2LSO of a respective one of the pair of female heater terminals T2, the resistance value between the terminals OT1 and OT2 may be measured to be abnormal, so it is possible to accurately determine misassembly. Accordingly, it is possible to prevent the fuel cell 100 from overheating due to misassembly, and a sufficient surface contact area between the heater plate 310 and the pad 320 is secured, thereby enhancing a seal against external moisture and external air.

FIG. 18 is a view showing a method of assembling the fuel cell 100 shown in FIG. 10, according to an embodiment.

Referring to FIGS. 10 and 18, when it is intended to assemble the second terminal unit T2 of the heating element 330 with the first terminal unit T1 of the heater plate 310B, if the heating element 330 is moved along the path leading to misassembly with the heater plate 310B shown in FIG. 7 or FIG. 16, e.g. in the direction indicated by the arrow AR3, the heating element 330 may collide with the engagement guide member 420, as indicated by "CP". Further, even if a collision does not occur, due to the presence of the engagement guide member 420, misassembly shown in FIG. 7 or FIG. 16 may be prevented, or misassembly may be a different form and less severe than that shown in FIG. 7 or FIG. 16. As such, the engagement guide member 420 may guide the moving path so that each of the pair of male heater terminals of the first terminal unit T1 is inserted into the space SP in a respective one of the pair of female heater terminals of the second terminal unit T2, or may interrupt the occurrence of misassembly shown in FIG. 7 or FIG. 16, thereby preventing in advance misassembly between the pair of male heater terminals of the first terminal unit T1 and the pair of female heater terminals of the second terminal unit T2, thus guiding normal assembly therebetween.

In addition, since the engagement guide member 420 is disposed between the current-collecting plate 340 and the first terminal unit T1, the electrical insulation distance between the current-collecting plate 340 and the first terminal unit T1 increases, thereby increasing the electrical stability of the fuel cell.

As shown in FIG. 18, when the fuel cell 100 further includes the insulation part 410, in addition to the engagement guide member 420, it is possible to accurately determine misassembly between the pair of male heater terminals of the first terminal unit T1 and the pair of female heater terminals of the second terminal unit T2.

As is apparent from the above description, according to the fuel cell of the embodiments, it is possible to accurately determine misassembly between the first terminal unit of the heater plate and the second terminal unit of the heating element, thereby preventing the fuel cell from overheating due to misassembly. In addition, since a sufficient surface contact area between the heater plate and the pad is secured, a seal against external moisture and external air is enhanced. In addition, it is possible to guide the moving path so that each of the pair of male heater terminals of the first terminal unit is inserted into a space in a respective one of the pair of female heater terminals of the second terminal unit or to interrupt misassembly between the pair of male heater terminals of the first terminal unit and the pair of female heater terminals of the second terminal unit, thus guiding normal assembly therebetween. In addition, it is possible to increase the electrical insulation distance between the current-collecting plate and the first terminal unit, thereby increasing the electrical stability of the fuel cell.

However, the effects achievable through the disclosure are not limited to the above-mentioned effects, and other effects not mentioned herein will be clearly understood by those skilled in the art from the above description.

The above-described various embodiments may be combined with each other without departing from the objects of the present disclosure unless they are incompatible with each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:
1. A fuel cell, comprising:
a cell stack comprising a plurality of unit cells stacked in a first direction;
a plate disposed at one of two end portions of the cell stack, the plate comprising a first terminal unit protruding in a second direction intersecting the first direction;
a heating element comprising a second terminal unit engaged in direct contact with the first terminal unit of the plate in the second direction, the heating element being disposed between the one of the two end portions of the cell stack and the plate; and
an insulation part disposed at at least one of the first terminal unit or the second terminal unit;
wherein one of the first terminal unit and the second terminal unit comprises a pair of male heater terminals protruding in the second direction, and a remaining one of the first terminal unit and the second terminal unit comprises a pair of female heater terminals into which the pair of male heater terminals is inserted;
wherein each of the pair of male heater terminals comprises a first portion that is in contact with a respective one of the pair of female heater terminals, rather than being inserted into the respective one of the pair of female heater terminals;

wherein each of the pair of female heater terminals comprises a second portion that is in contact with the first portion; and wherein the insulation part is disposed on at least one of the first portion or the second portion.

2. The fuel cell according to claim 1, wherein:
each of the pair of female heater terminals comprises a body defining a space into which a respective one of the pair of male heater terminals is inserted;
each of the pair of male heater terminals comprises an upper surface and a lower surface formed opposite the upper surface; and
in case that one of the pair of male heater terminals is inserted into a respective one of the pair of female heater terminals, the upper surface is in contact with an inner upper surface of the body defining the space, and the lower surface is in contact with an inner lower surface of the body defining the space.

3. The fuel cell according to claim 2, wherein:
the insulation part is disposed on an outer lower surface formed opposite the inner lower surface of the body;
the outer lower surface of the body corresponds to the second portion; and
a planar area of the outer lower surface of the body is greater than a planar area of the upper surface of each of the pair of male heater terminals.

4. The fuel cell according to claim 2, wherein:
the upper surface of each of the pair of male heater terminals corresponds to the first portion; and
the insulation part is disposed on the upper surface.

5. The fuel cell according to claim 2, wherein the insulation part comprises an insulation tube formed in a shape of a tube surrounding an outer surface of the body defining the space.

6. The fuel cell according to claim 1, wherein the plate further comprises:
a heater wiring connector configured to receive current from an outside of the plate; and
a wire connecting the first terminal unit to the heater wiring connector.

7. The fuel cell according to claim 1, wherein the plate corresponds to at least one of a first end plate and a second end plate respectively disposed at the two end portions of the cell stack.

8. The fuel cell according to claim 1, further comprising:
a first end plate and a second end plate respectively disposed at the two end portions of the cell stack,
wherein the plate comprises a heater plate disposed between at least one of the first end plate or the second end plate and the one of the two end portions of the cell stack.

9. A fuel cell, comprising:
a cell stack configured such that a plurality of unit cells is stacked in a first direction;
a plate disposed at one of two end portions of the cell stack, the plate comprising:
a first terminal unit protruding in a second direction intersecting the first direction;
a terminal-mounting hole exposing the first terminal unit; and
an engagement guide member at least partially overlapping the terminal-mounting hole in the first direction and protruding toward the terminal-mounting hole in the second direction; and a heating element comprising a second terminal unit engaged in direct contact with the first terminal unit of the plate in the second direction, the heating element being disposed between the one of the two end portions of the cell stack and the plate, wherein one of the first terminal unit and the second terminal unit comprises a pair of male heater terminals protruding in the second direction, and a remaining one of the first terminal unit and the second terminal unit comprises a pair of female heater terminals into which the pair of male heater terminals is inserted.

10. The fuel cell according to claim 9, wherein:
each of the pair of female heater terminals comprises a body defining a space into which a respective one of the pair of male heater terminals is inserted;
each of the pair of male heater terminals comprises:
an upper surface that is in contact with an inner upper surface of the body defining the space; and
a lower surface that is in contact with an inner lower surface of the body defining the space and is formed opposite the upper surface; and
at least a portion of the engagement guide member overlaps the upper surface of each of the pair of male heater terminals in the first direction.

11. The fuel cell according to claim 9, further comprising a pad disposed between the plate and the heating element.

12. The fuel cell according to claim 11, wherein:
the plate comprises a concave portion into which at least one of the heating element or the pad is received; and
the concave portion faces the cell stack.

13. The fuel cell according to claim 12, further comprising a current-collecting plate disposed between the heating element and the one of the two end portions of the cell stack.

14. The fuel cell according to claim 13, wherein the current-collecting plate is received in the concave portion.

15. The fuel cell according to claim 13, wherein the current-collecting plate has a cross-sectional shape that is stacked over the concave portion.

16. The fuel cell according to claim 13, wherein the engagement guide member is disposed between the current-collecting plate and the first terminal unit.

17. The fuel cell according to claim 9, further comprising an insulation part disposed at at least one of the first terminal unit or the second terminal unit, wherein:
each of the pair of male heater terminals comprises a first portion that is in contact with a respective one of the pair of female heater terminals, rather than being inserted into the respective one of the pair of female heater terminals;
each of the pair of female heater terminals comprises a second portion that is in contact with the first portion; and
the insulation part is disposed on at least one of the first portion or the second portion.

18. A fuel cell, comprising:
a cell stack comprising a plurality of unit cells stacked in a first direction;
end plates respectively disposed at two end portions of the cell stack; and
heater assemblies respectively disposed between the end plates and the two end portions of the cell stack, wherein each of the heater assemblies comprises:
a heater plate disposed between each of the end plates and a corresponding one of the two end portions of the cell stack, the heater plate comprising a first terminal unit protruding in a second direction intersecting the first direction;

a heating element comprising a second terminal unit engaged in direct contact with the first terminal unit in the second direction, the heating element being disposed between the heater plate and the corresponding one of the two end portions of the cell stack; and an insulation part disposed at at least one of the first terminal unit or the second terminal unit;

wherein one of the first terminal unit and the second terminal unit comprises a pair of male heater terminals protruding in the second direction, and a remaining one of the first terminal unit and the second terminal unit comprises a pair of female heater terminals into which the pair of male heater terminals is inserted;

wherein each of the pair of male heater terminals comprises a first portion that is in contact with a respective one of the pair of female heater terminals, rather than being inserted into the respective one of the pair of female heater terminals;

wherein each of the pair of female heater terminals comprises a second portion that is in contact with the first portion; and wherein the insulation part is disposed on at least one of the first portion or the second portion.

* * * * *